United States Patent

Watanabe et al.

(10) Patent No.: US 9,893,568 B2
(45) Date of Patent: Feb. 13, 2018

(54) WIRELESS POWER TRANSMITTER, CONTROL CIRCUIT AND CONTROL METHOD THEREOF, AND CHARGER

(71) Applicant: ROHM CO., LTD., Kyoto (JP)

(72) Inventors: Masatoshi Watanabe, Kyoto (JP); Tomoya Morinaga, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/290,016

(22) Filed: Oct. 11, 2016

(65) Prior Publication Data

US 2017/0104370 A1   Apr. 13, 2017

(30) Foreign Application Priority Data

Oct. 13, 2015  (JP) ................................. 2015-202258

(51) Int. Cl.
*H02J 7/02* (2016.01)
*H02J 50/12* (2016.01)
*H02J 50/80* (2016.01)
*H02J 50/60* (2016.01)

(52) U.S. Cl.
CPC ............. *H02J 50/12* (2016.02); *H02J 7/025* (2013.01); *H02J 50/60* (2016.02); *H02J 50/80* (2016.02)

(58) Field of Classification Search
CPC ... H02J 7/005; H02J 7/025; H02J 7/02; H01F 38/14
See application file for complete search history.

(56) References Cited

U.S. PATENT DOCUMENTS

2014/0347008 A1*  11/2014  Chae ........................ H02J 5/005
                                                        320/108
2015/0180287 A1*  6/2015  Endo ....................... H02J 17/00
                                                        307/104
2016/0285279 A1*  9/2016  Mehas ..................... H02M 7/23

FOREIGN PATENT DOCUMENTS

JP     2013-038854     2/2013
JP     2014-107971     6/2014

* cited by examiner

*Primary Examiner* — Rexford Barnie
*Assistant Examiner* — Terrence Willoughby
(74) *Attorney, Agent, or Firm* — Fish & Richardson P.C.

(57) ABSTRACT

A wireless power transmitter for transmitting a power signal to a wireless power receiver is disclosed. The transmitter includes a transmission antenna, an inverter circuit including a plurality of switches; and a control circuit configured to demodulate a control signal received by the transmission antenna from the transmitter and control the inverter circuit based on power control data included in the control signal. The control circuit is configured to select among a first, second and third mode. For example, in the first mode in which a first pair including first and second switches and a second pair including third and fourth switches are both complementarily switched at a duty ratio of 50%, and a phase difference of the first pair and the second pair is changed between a minimum value and a maximum value depending on a transmission power, and the inverter circuit performs a full-bridge operation.

15 Claims, 10 Drawing Sheets

WIRELESS POWER TRANSMITTER, CONTROL CIRCUIT AND CONTROL METHOD THEREOF, AND CHARGER

CROSS-REFERENCE TO RELATED APPLICATION

This application is based upon and claims the benefit of priority from Japanese Patent Application No. 2015-202258, filed on Oct. 13, 2015, the entire contents of which are incorporated herein by reference.

TECHNICAL FIELD

The present disclosure relates to a wireless power supply technique, and more particularly, to the control of transmission power.

BACKGROUND

Recently, in order to supply electric power to an electronic device, a wireless power supply has begun to come into commonplace use. In order to promote the compatibility of products of different manufacturers, a wireless power consortium (WPC) has been organized, and a Qi standard, which is an international standard, has been developed by the WPC.

A wireless power supply that conforms to the Qi standard uses electromagnetic induction between a transmission coil and a reception coil.

FIG. 1 is a view illustrating a configuration of a wireless power supply system 10 that conforms to the Qi standard. The power supply system 10 includes a power transmitter (TX) 20 and a power receiver (RX) 30. The power receiver 30 is mounted on an electronic device such as a mobile phone terminal, a smartphone, an audio player, a game machine, or a tablet terminal.

The power transmitter 20 includes a transmission coil (primary coil) 22, an inverter circuit 24, a controller 26, and a demodulator 28. The inverter circuit 24 includes an H-bridge circuit (full-bridge circuit) or a half-bridge circuit and applies a driving signal S1, specifically, a pulse signal, to the transmission coil 22 such that a driving current flows through the transmission coil 22, thereby allowing the transmission coil 202 to generate an electrical power signal S2 in the form of an electromagnetic field. The controller 26 performs an overall control of the entire power transmitter 20.

In the Qi standard, a communication protocol is defined between the power transmitter 20 and the power receiver 30, which enables information transmission from the power receiver 30 to the power transmitter 20 via a control signal S3. The control signal S3 in the form of an AM (Amplitude Modulation) modulated signal using backscatter modulation is transmitted from the reception coil 32 (a secondary coil) to the transmission coil 22. The control signal S3 includes, for example, electric power control data (also referred to as a packet) for controlling an amount of electric power to be supplied to the power receiver 30, data indicating unique information of the power receiver 30, or the like. The demodulator 28 demodulates the control signal S3 based on a current or a voltage from the transmission coil 22. The controller 26 controls the inverter circuit 24 based on the power control data included in the demodulated control signal S3.

The power receiver 30 includes a reception coil 32, a rectifying circuit 34, a smoothing condenser 36, a modulator 38, a load 40, a controller 42, and a power circuit 44. The reception coil 32 receives a power signal S2 from the transmission coil 22, and transmits a control signal S3 to the transmission coil 22. The rectifying circuit 34 and the smoothing condenser 36 rectifies and smoothes a current S4 induced in the reception coil 32 depending on the power signal S2 to convert the same into a DC voltage $V_{RECT}$.

The power circuit 44 charges a secondary battery (not shown) using electric power supplied from the power transmitter 20 or steps up or down the DC voltage $V_{RECT}$ to supply the same to the controller 42 and the load 40.

The controller 42 generates electric power control data (also referred to as a control error (CE) packet) for controlling a power supply amount from the power transmitter 20 such that the rectified voltage $V_{RECT}$ approaches its target value. The modulator 38 modulates a coil current of the reception coil 32 depending on the control signal S3 including the electric power control data, thereby transmitting the control signal S3 to the transmission coil 22.

The Qi standard was initially developed for a low power of 5 W or lower of mobile phone terminals, smartphones, tablet terminals, or the like (Volume I Low Power, hereinafter referred to as Low Power standard). Thereafter, the preparation of developing a middle power up to 15 W (Volume II Middle Power, hereinafter referred to as Middle Power standard) is in progress, and the support for a large power of 120 W in the future is planned.

In the Low Power standard, the inverter circuit 24 is configured as a half-bridge inverter, and in the Middle Power standard, the inverter circuit 24 is configured as a full-bridge circuit. When the power transmitter 20 supports both the power receiver 30 of the Low Power standard and the power receiver 30 of the Middle Power standard, the inverter circuit 24 is configured as a full-bridge circuit to change a transmission power within a wide range and a full-bridge operation and a half-bridge operation are required to be switched depending on a transmission power.

The present inventors reviewed switching between the full-bridge operation and the half-bridge operation and recognized that such switching caused discontinuity of transmission power from the power transmitter 20, further, discontinuity of rectified voltage $V_{RECT}$ in the power receiver 30. The discontinuity causes degradation of the communication quality in the power receiver 30 side and impairs the stability of the power receiver 30. Further, the discontinuity makes an operating point of the power receiver 30 unstable, thus making charging unstable.

In addition, when a rapid increase in the rectified voltage $V_{RECT}$ which results from the operation switching of the inverter circuit 24 is permitted, the rated voltage of the power receiver 30 should be increased and circuit components are required to have high pressure resistance, increasing the cost.

Further, this problem should not be considered as a general recognition of a person skilled in the art but independently recognized by the present inventors.

SUMMARY

The present disclosure provides some embodiments of a power transmitter capable of seamlessly switching a full-bridge operation and a half-bridge operation.

According to one embodiment of the present disclosure, there is provided a wireless power transmitter for transmitting a power signal to a wireless power receiver. The wireless power transmitter includes: a transmission antenna including a transmission coil; an inverter circuit including a first switch installed between a power line and one end of the transmission antenna, a second switch installed between the power line and the other end of the transmission antenna, a third switch installed between the one end of the transmission antenna and a ground line, and a fourth switch installed between the other end of the transmission antenna and the ground line; and a control circuit configured to demodulate a control signal received by the transmission antenna from the wireless power transmitter and control the inverter circuit based on power control data included in the control signal. The control circuit is configured to select: (i) a first mode in which a first pair including the first switch and the second switch are complementarily switched at a duty ratio of 50%, a second pair including the third switch and the fourth switch are complementarily switched at a duty ratio of 50%, a phase difference of the first pair and the second pair is changed between a minimum value and a maximum value depending on a transmission power, and the inverter circuit performs a full-bridge operation; (ii) a second mode in which the first pair are complementarily switched at a duty ratio of 50%, a switching frequency is changed depending on the transmission power, and the inverter circuit performs a half-bridge operation; and (iii) a third mode in which the first pair are complementarily switched at a duty ratio of 50%, the second pair are complementarily switched at a duty ratio of 50%, the phase difference of the first pair and the second pair is changed to the minimum value, the switching frequency is changed depending on the transmission power, and the inverter circuit performs a full-bridge operation.

According to the present embodiment, by using the third mode, it is possible to increase the continuity between the first mode in which the inverter circuit performs a full-bridge operation and the second mode in which the inverter circuit performs a half-bridge operation.

When the transmission power is decreased, the control circuit may be configured to perform transition in the order of the first mode and the third mode.

When the transmission power is increased, the control circuit may be configured to perform transition from the second mode to the first mode without passing through the third mode.

The control circuit may be configured to select, in addition to the first mode to third mode: (iv) a fourth mode in which the first pair are complementarily switched at a duty ratio of 50%, the second pair are complementarily switched at a duty ratio of 50%, the phase difference of the first pair and the second pair is changed to the maximum value, the switching frequency is changed depending on the transmission power, and the inverter circuit performs a full-bridge operation. When the transmission power is further increased, the first mode may transition to the fourth mode.

The control circuit may be configured to select, in addition to the first mode to third mode: (v) a fifth mode in which the first pair are complementarily switched to a maximum switching frequency, a duty ratio of the first pair is changed depending on the transmission power, and the inverter circuit performs a half-bridge operation. When the transmission power is further decreased, the second mode may transition to the fifth mode.

The wireless power transmitter may be based on a Qi standard.

According to another embodiment of the present disclosure, there is provided a charger. The charger may include the aforementioned wireless power transmitter.

According to another embodiment of the present disclosure, there is provided a control circuit for use in a wireless power transmitter for transmitting a power signal to a wireless power receiver. The wireless power transmitter includes, in addition to the control circuit: a transmission antenna including a transmission coil; and an inverter circuit including a first switch installed between a power line and one end of the transmission antenna, a second switch installed between the power line and the other end of the transmission antenna, a third switch installed between the one end of the transmission antenna and a ground line, and a fourth switch installed between the other end of the transmission antenna and the ground line. The control circuit includes: a demodulator configured to demodulate a control signal received by the transmission antenna from the wireless power transmitter; and a power control part configured to generate the control signal to the inverter circuit based on power control data included in the control signal and instructing an increase or a decrease of transmission power. The power control part may be configured to select: (i) a first mode in which a first pair including the first switch and the second switch are complementarily switched at a duty ratio of 50%, a second pair including the third switch and the fourth switch are complementarily switched at a duty ratio of 50%, a phase difference of the first pair and the second pair is changed between a minimum value and a maximum value depending on a transmission power, and the inverter circuit performs a full-bridge operation; (ii) a second mode in which the first pair are complementarily switched at a duty ratio of 50%, a switching frequency is changed depending on the transmission power, and the inverter circuit performs a half-bridge operation; and (iii) a third mode in which the first pair are complementarily switched at a duty ratio of 50%, the second pair are complementarily switched at a duty ratio of 50%, the phase difference of the first pair and the second pair is changed to the minimum value, the switching frequency is changed depending on the transmission power, and the inverter circuit performs a full-bridge operation.

The control circuit may be integrated on a single semiconductor substrate.

The term "integrated" may include a case where all the components of a circuit are formed on a semiconductor substrate or a case where major components of a circuit are integrated, and some resistors, capacitors, or the like may be installed outside the semiconductor substrate in order to adjust circuit constants. By integrating a circuit on a single chip, it is possible to reduce an area of the circuit and also to uniformly maintain the characteristics of the circuit device.

Further, arbitrarily combining the foregoing components or substituting the components or expressions of the present disclosure with one another among a method, an apparatus, and a system is also effective as an embodiment of the present disclosure.

DETAILED DESCRIPTION

Figure 1:
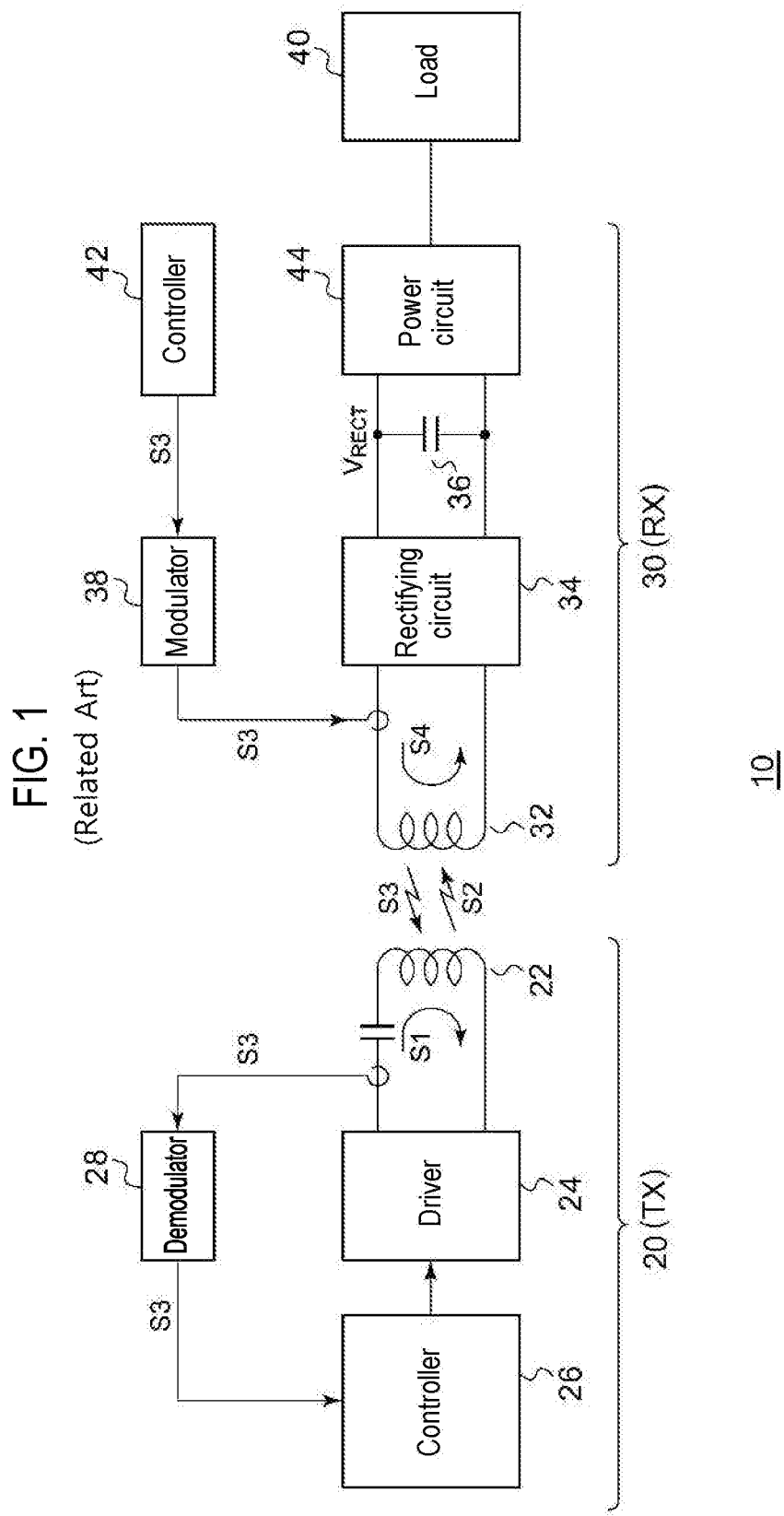
FIG. 1 is a view illustrating a configuration of a wireless power supply system based on the Qi standard.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection between the member A and the member B or does not impair functions and effects achieved by combinations of the member A and the member B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the members A and C or the members B and C are directly connected.

Figure 2:
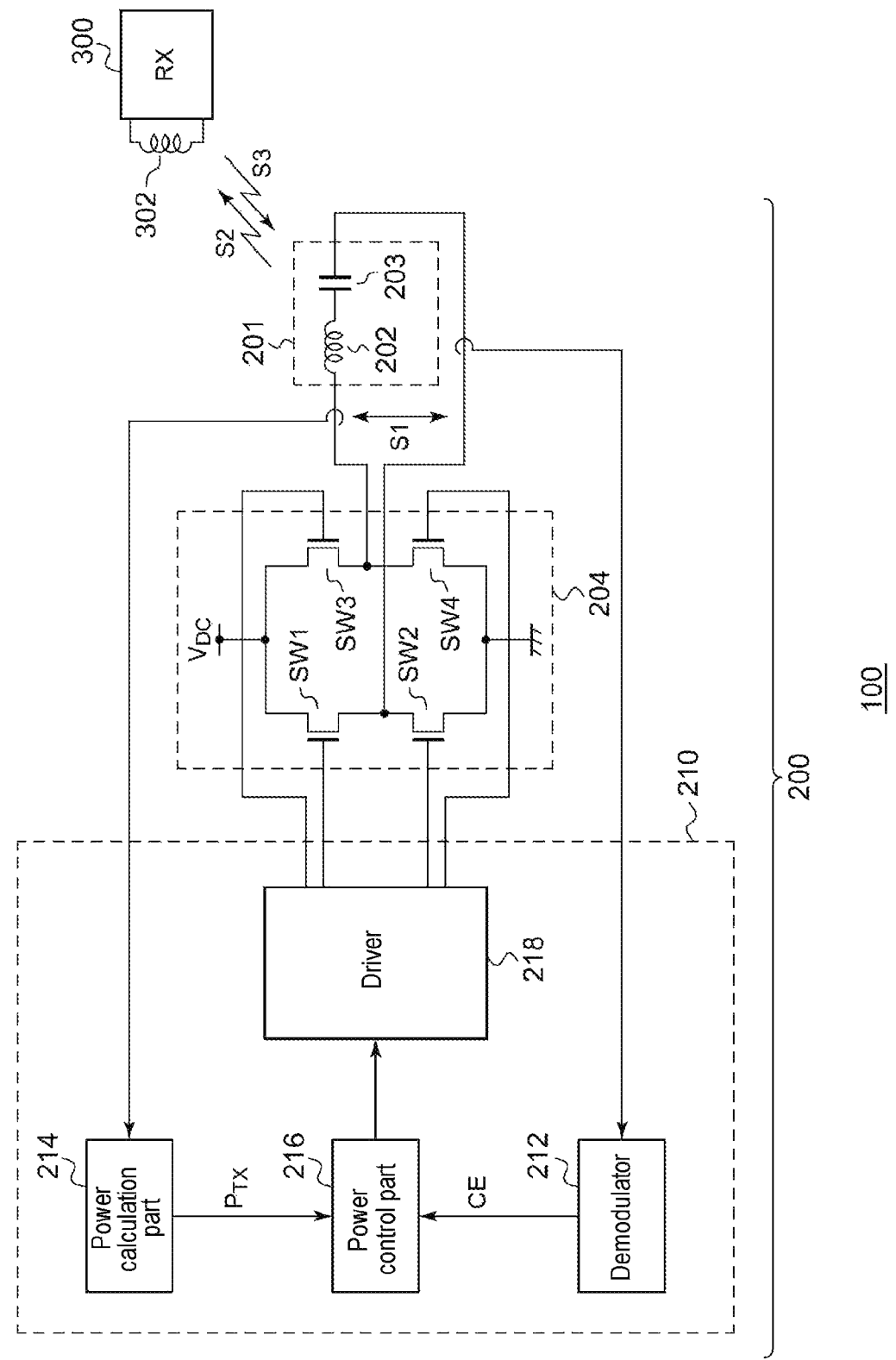
FIG. 2 is a block diagram of a power supply system including a wireless power transmitter according to an embodiment of the present disclosure.

FIG. 2 is a block diagram of a power supply system 100 including a wireless power transmitter according to an embodiment of the present disclosure. The power supply system 100 includes a power transmitter (TX) 200 and a power receiver (RX) 300. The power receiver 300 is mounted on an electronic device such as a mobile phone terminal, a smartphone, an audio player, a game machine, or a tablet terminal. In the following description, it is assumed that the power transmitter 200 and the power receiver 300 are based on the Qi standard.

The power transmitter 200 is mounted on, for example, a charger including a charge stand. The power transmitter 200 includes a transmission antenna 201, an inverter circuit 204, and a control circuit 210. The transmission antenna 201 includes a transmission coil (primary coil) 202 and a resonant condenser 203 connected in series.

The inverter circuit 204 is an H-bridge circuit (full-bridge circuit) including the first switch SW1 to the fourth switch SW4, converts a DC voltage $V_{DD}$ from a power source (not shown) into an AC driving signal S1, and supplies the same to the transmission antenna 201. The inverter circuit 204 applies the driving signal S1 between both ends of the transmission antenna 201 depending on the switching of the first switch SW1 to the fourth switch SW4. As a result, a power signal S2 of an electromagnetic field is generated in the transmission coil 202 by a driving current flowing through the transmission coil 202.

The first switch SW1 is installed between a power line and one end of the transmission antenna 201. The second switch SW2 is installed between the power line and the other end of the transmission antenna 201. The third switch SW3 is installed between the one end of the transmission antenna 201 and a ground line, and the fourth switch SW4 is installed between the other end of the transmission antenna 201 and the ground line. The first switch SW1 and the second switch SW2 are referred to as a first pair, and the third switch SW3 and the fourth switch SW4 are referred to as a second pair. The two switches forming each pair are complimentarily switched by the control circuit 210.

The control circuit 210 performs an overall control of the entire power transmitter 200. The control circuit 210 demodulates a control signal S3 received by the transmission antenna 201 from the wireless power receiver 300, and changes a transmission power $P_{TX}$ by controlling the inverter circuit 204 based on power control data (a control error packet, hereinafter, referred to as "a CE packet") included in the control signal S3.

In the Qi standard, a communication protocol is defined between the power transmitter 200 and the power receiver 300, and information may be transferred by the control signal S3 from the power receiver 300 to the power transmitter 200. The control signal S3 is amplitude-modulated (AM) using backscatter modulation and transmitted from the reception coil 302 (secondary coil) to the transmission coil 202. The control signal S3 includes, for example, power control data (also referred to as a control error (CE) packet) for controlling an amount of power supply to the power receiver 300. The CE packet indicates an error between a rectified voltage generated by the power receiver 300 and its target value, and when the rectified voltage is higher than the target value, the CE packet has a negative value, and when the rectified voltage is lower than the target value, the CE packet has a positive value. In the Qi standard, a feedback loop of the proportional integral differential (PID) control is formed with respect to the transmission power by the power transmitter 200 and the power receiver 300.

The control circuit 210 demodulates the control signal S3 received by the transmission antenna 201 from the power receiver 300, and controls the inverter circuit 204 based on power control data (CE packet) included in the control signal S3.

In this embodiment, the control circuit 210 may select five modes of the first mode $\varphi 1$ to the fifth mode $\varphi 5$ depending on a range of a desired transmission power $P_{TX}$, and switches the inverter circuit 204 in a different manner for each mode.

(i) First Mode $\varphi 1$

Figure 3:
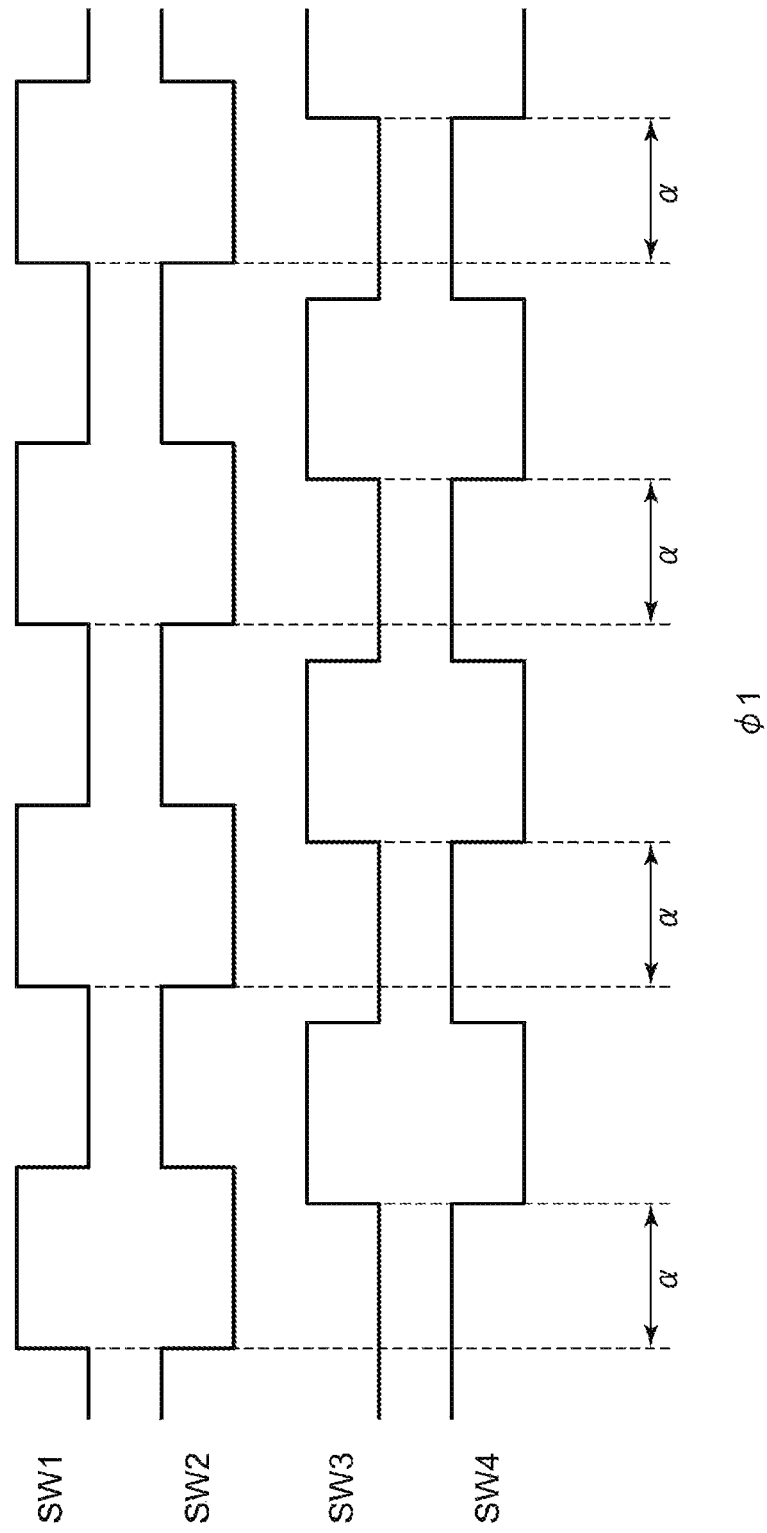
FIG. 3 is an operational waveform diagram of an inverter circuit in a first mode.

FIG. 3 is an operational waveform diagram of the inverter circuit 204 in the first mode $\varphi 1$. In the first mode $\varphi 1$, the inverter circuit 204 performs a full-bridge operation in the following manner. The first pair SW1 and SW2 is complementarily switched at a duty ratio of 50%, and the second pair SW3 and SW4 is complementarily switched at a duty ratio of 50%. A switching frequency f is fixed to a first frequency $f_1$ (e.g., 160 kHz). The control circuit 210 changes a phase difference $\alpha$ of the first pair and the second pair between its minimum value $\alpha_{MIN}$ and maximum value $\alpha_{MAX}$ depending on the desired transmission power $P_{TX}$. FIG. 3 illustrates a state when the phase $\alpha$ is fixed to a certain value. For example, $\alpha_{MAX}$ may be 180° and $\alpha_{MIN}$ may be 10°.

(ii) Second Mode φ2

Figure 4:
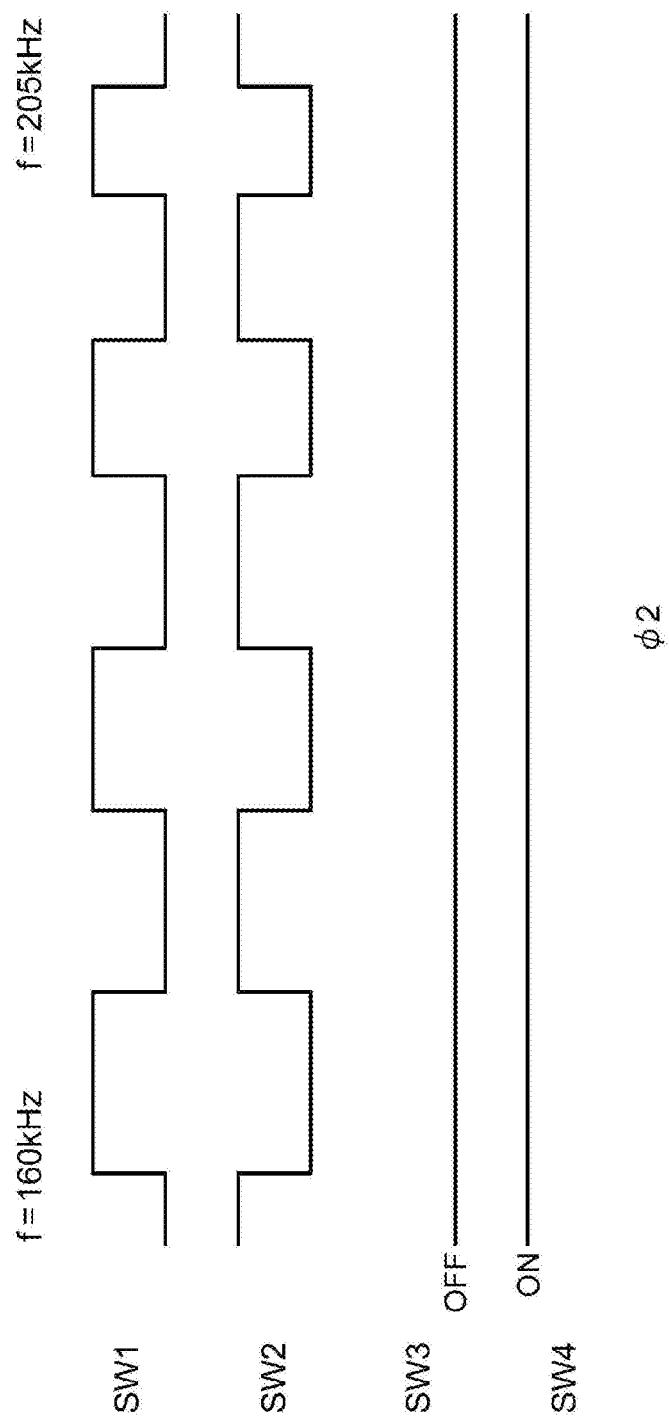
FIG. 4 is an operational waveform diagram of an inverter circuit in a second mode.

FIG. 4 is an operational waveform diagram of the inverter circuit 204 in the second mode φ2. Further, in each of FIGS. 4 to 7, the left side has a great transmission power $P_{TX}$ and the right side has a small transmission power $P_{TX}$. In the second mode φ2, the inverter circuit 204 performs a half-bridge operation in the following manner. The first pair SW1 and SW2 is complementarily switched at a duty ratio of 50%, and in the second pair SW3 and SW4, SW3 is turned off and SW4 is fixed to an ON state. Further, in a modification, SW3 may be turned off and SW4 may be turned on. In the second mode φ2, the control circuit 210 changes the switching frequency f between a first frequency $f_1$ and a second frequency $f_2$ depending on the desired transmission power $P_{TX}$. The second frequency $f_2$ is, for example, 205 kHz.

(iii) Third Mode φ3

Figure 5:
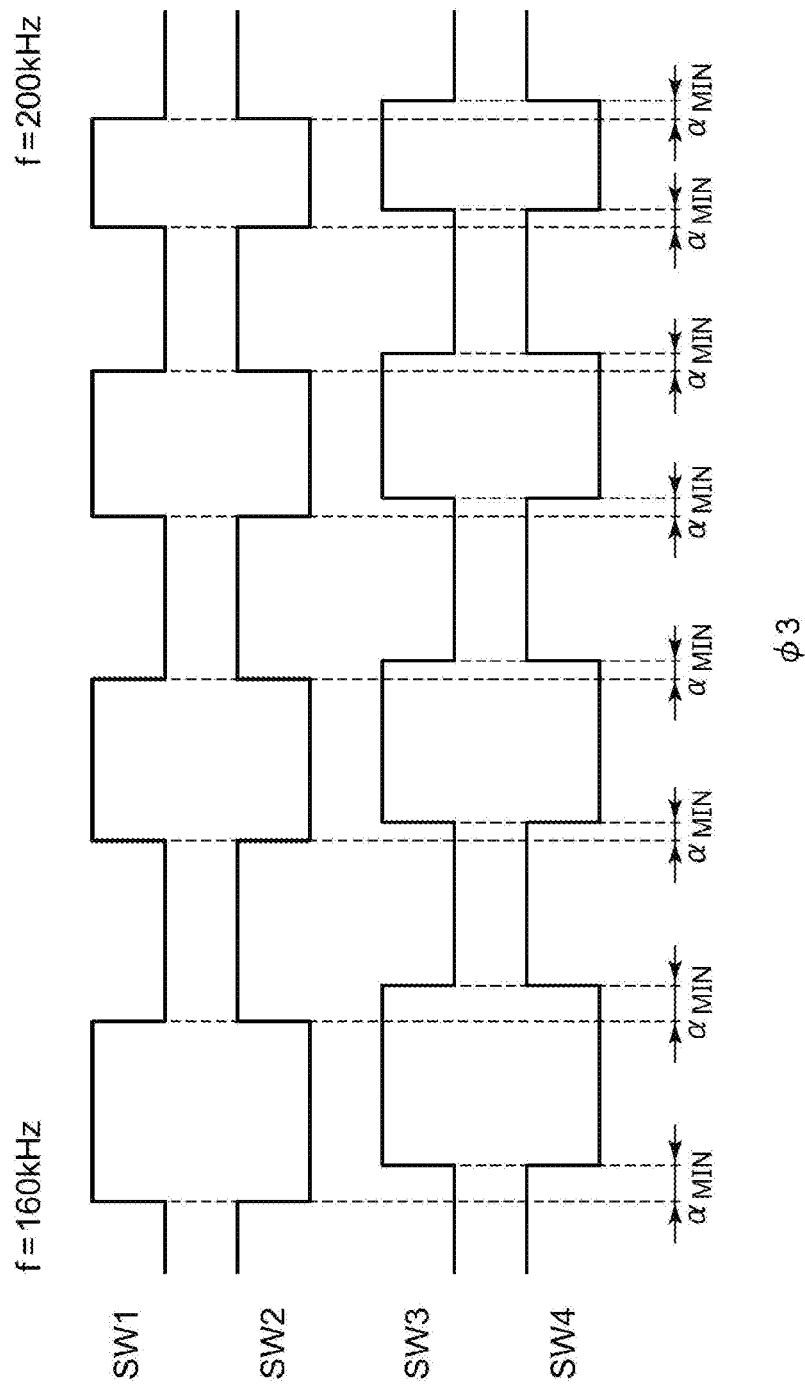
FIG. 5 is an operational waveform diagram of an inverter circuit in a third mode.

FIG. 5 is an operational waveform diagram of the inverter circuit 204 in the third mode φ3. In the third mode φ3, the inverter circuit 204 performs a full-bridge operation in the following manner. In the third mode φ3, the first pair SW1 and SW2 is complementarily switched at a duty ratio of 50%, and the second pair SW3 and SW4 is also complementarily switched at a duty ratio of 50%. The control circuit 210 fixes the phase difference α of the first pair SW1 and SW2 and the second pair SW3 and SW4 to a predetermined value (for example, a minimum value $α_{MIN}$) smaller than 180°, and changes the switching frequency f between the first frequency $f_1$ and a third frequency $f_3$ depending on the desired transmission power $P_{TX}$. The third frequency $f_3$ is, for example, 200 kHz.

(iv) Fourth Mode φ4

Figure 6:
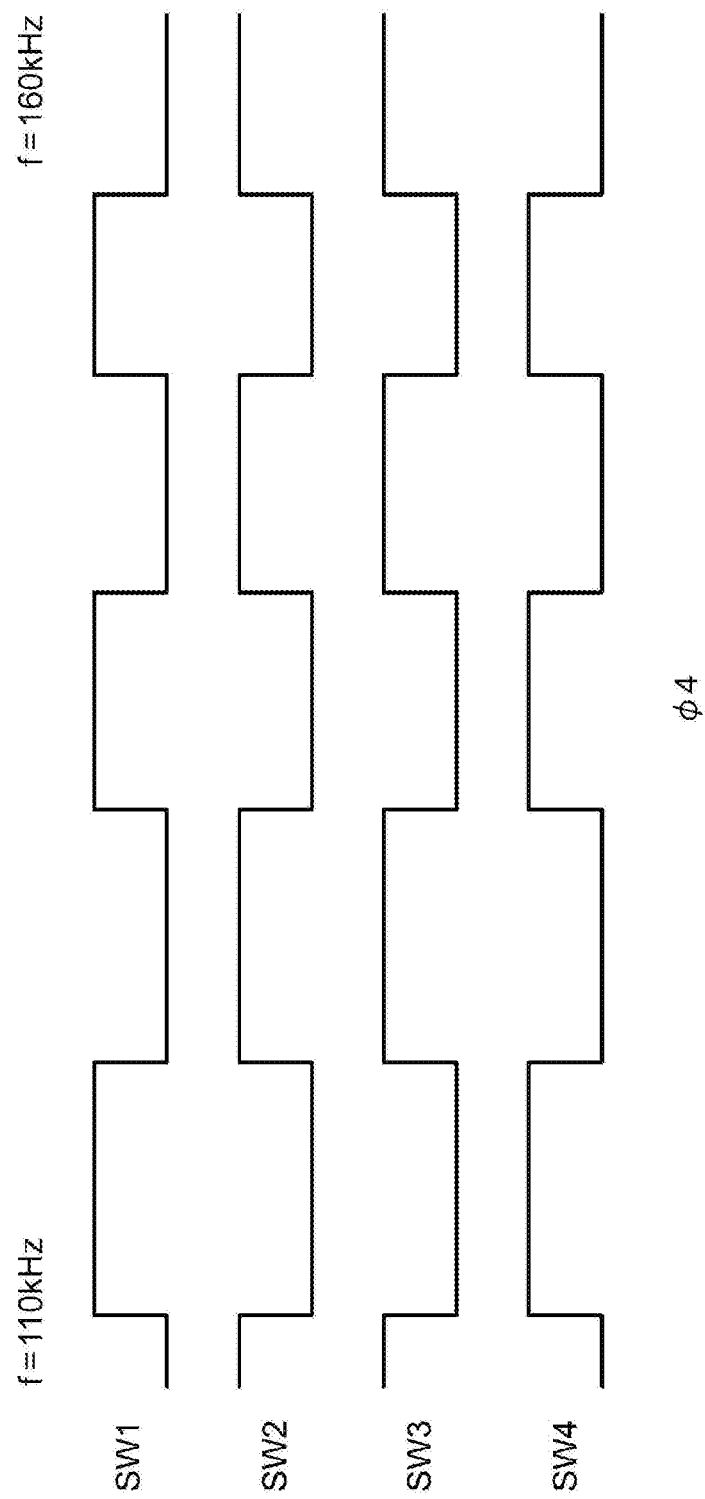
FIG. 6 is an operational waveform diagram of an inverter circuit in a fourth mode.

FIG. 6 is an operational waveform diagram of the inverter circuit 204 in the fourth mode φ4. In the fourth mode φ4, the inverter circuit 204 performs a full-bridge operation in the following manner. The first pair SW1 and SW2 is complementarily switched at a duty ratio of 50%, and the second pair SW3 and SW4 is also complementarily switched at a duty ratio of 50%. In the fourth mode φ4, the control circuit 210 changes the phase difference α of the first pair SW1 and SW2 and the second pair SW3 and SW4 to the maximum value $α_{Max}$ (i.e., 180°) and changes the switching frequency f between the first frequency $f_1$ and the lowest frequency $f_0 (f_0 < f_1)$ depending on the desired transmission power $P_{TX}$. For example, $f_0 = 110$ kHz.

(v) Fifth Mode φ5

Figure 7:
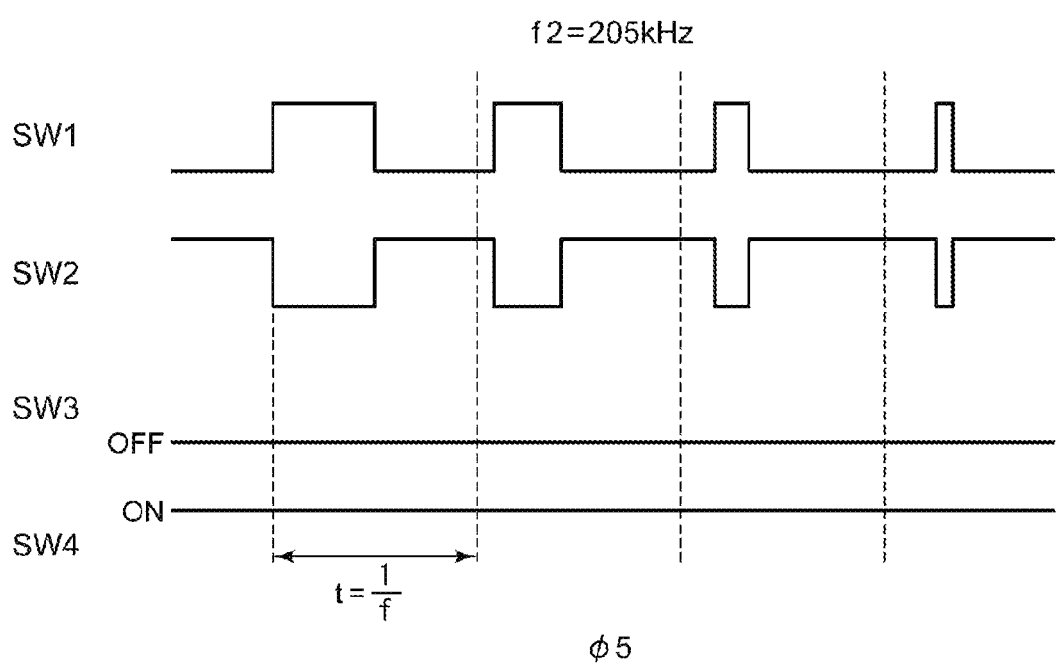
FIG. 7 is an operational waveform diagram of an inverter circuit in a fifth mode.

FIG. 7 is an operational waveform diagram of the inverter circuit 204 in the fifth mode φ5. In the fifth mode φ5, the inverter circuit 204 performs a half-bridge operation in the following manner. The first pair SW1 and SW2 is complementarily switched at a maximum switching frequency (aforementioned second frequency $f_2$), and in the second pair SW3 and SW4, SW3 is turned off and SW4 is fixed to an ON state. Further, in a modification, SW3 may be turned off, and SW4 may be turned on. The control circuit 210 changes a duty ratio d of the first pair SW1 and SW2 between the maximum value $D_{MAX}$ and the minimum value $D_{MIN}$ depending on the desired transmission power $P_{TX}$. The maximum value $D_{MAX}$ is, for example, 50%. The minimum value $D_{MIN}$ may be about 5%.

Figure 8:
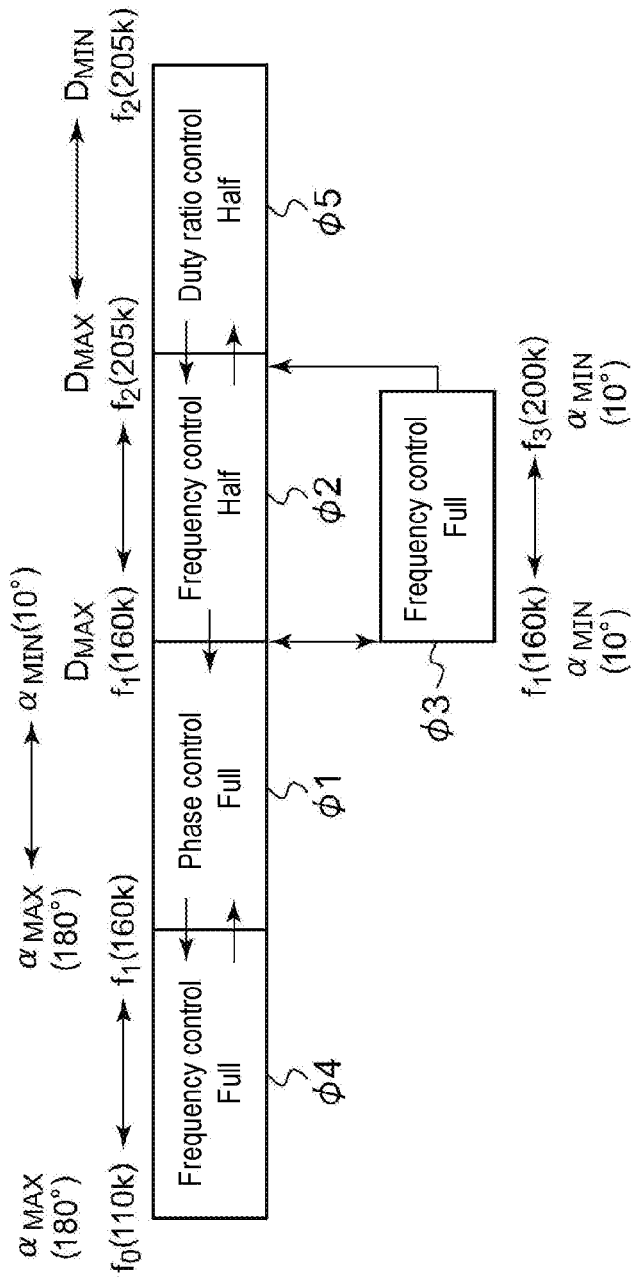
FIG. 8 is a view schematically illustrating the first to fifth modes.

FIG. 8 is a view schematically illustrating the first mode φ1 to the fifth mode φ5.

Figure 9:
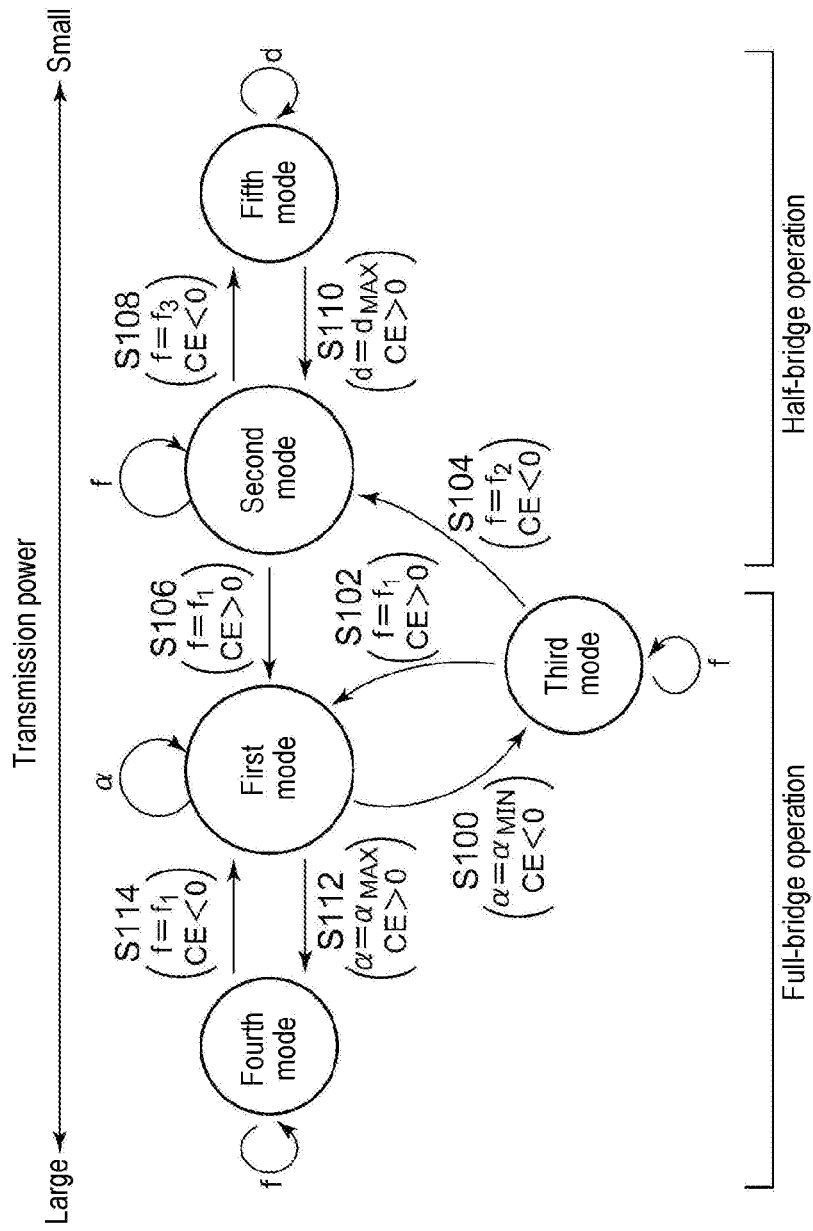
FIG. 9 is a state transition diagram of the first to fifth modes.

Next, switching control of the first mode φ1 to the fifth mode φ5 will be described. FIG. 9 is a state transition diagram of the first mode φ1 to the fifth mode φ5.

In the first mode φ1, in a state where the phase difference α is lowered to the minimum value $α_{MIN}$, when a power control signal (negative CE packet) instructing a decrease of the transmission power $P_{TX}$ is received, the first mode φ1 transitions to the third mode φ3 (S100).

In the third mode φ3, in a state where the switching frequency f is decreased to the first frequency $f_1$, when a power control signal (positive CE packet) instructing an increase of the transmission power $P_{TX}$ is received, the third mode φ3 transitions to the first mode φ1 (S102).

In the third mode φ3, in a state where the switching frequency f is increased to the second frequency $f_2$, when a power control signal (negative CE packet) instructing a decrease of the transmission power $P_{TX}$ is received, the third mode φ3 transitions to the second mode φ2 (S104).

In the second mode φ2, in a state where the switching frequency f is decreased to the first frequency $f_1$, when a power control signal (positive CE packet) instructing an increase of the transmission power $P_{TX}$ is received, the second mode φ2 transitions to the first mode φ1 (S106).

In the second mode φ2, in a state where the switching frequency f is increased to the third frequency $f_3$, when a power control signal (negative CE packet) instructing a decrease of the transmission power $P_{TX}$ is received, the second mode φ2 transitions to the fifth mode φ5 (S108).

In the fifth mode φ5, in a state where the duty ratio d is increased to the maximum value $d_{MAX}$, when a power control signal (positive CE packet) instructing an increase of the transmission power $P_{TX}$ is received, the fifth mode φ5 transitions to the second mode φ2 (S110).

Further, in the first mode φ1, in a state where the phase difference α is increased to the maximum value $α_{MAX}$, when a power control signal (positive CE packet) instructing an increase of the transmission power $P_{TX}$ is received, the first mode φ1 transitions to the fourth mode φ4 (S112).

In the fourth mode φ4, in a state where the switching frequency f is increased to the first frequency $f_1$, when a power control signal (negative CE packet) instructing a decrease of the transmission power $P_{TX}$ is received, the fourth mode φ4 transitions to the first mode φ1 (S114).

In other words, when the transmission power $P_{TX}$ is decreased, the control circuit 210 transitions from the first mode φ1 to the second mode φ2 through the third mode φ3. Further, when the transmission power $P_{TX}$ is increased, the control circuit 210 transitions from the second mode φ2 to the first mode φ1, without passing through the third mode φ3.

According to the power transmitter 200 of this embodiment, by passing through the third mode φ3, it is possible to increase the continuity between the first mode φ1 in which the inverter circuit 204 performs a full-bridge operation and the second mode φ2 in which the inverter circuit 204 performs a half-bridge operation. Thus, it is possible to prevent the discontinuity of the transmission power $P_{TX}$, further, the discontinuity of the rectified voltage $V_{RECT}$ in the power receiver 300, to improve the communication quality, and to increase the stability of the power receiver 300.

In addition, since a rapid increase in the rectified voltage $V_{RECT}$ in the power receiver 300 can be suppressed, a rated voltage of the power receiver 300 can be designed to be low and the pressure resistance of the circuit components can be lowered, thereby reducing the cost.

The present disclosure is intended to cover various device circuits derived from the aforementioned description, but is not limited to the specific configuration. Hereinafter, a more specific configuration example will be described to help understand and clarify the essence of the present disclosure and a circuit operation thereof, rather than to narrow the scope of the present disclosure.

A specific configuration of the control circuit 210 will be described. The control circuit 210 includes a demodulator 212, a power calculation part 214, a power control part 216, and a driver 218. The control circuit 210 is a functional IC integrated on a single semiconductor substrate.

The demodulator 212 demodulates a control signal S3 received by the transmission antenna 201 from the wireless power receiver. The power calculation part 214 measures a transmission power $P_{TX}$ from the transmission antenna 201. Specifically, the power calculation part 214 may detect a voltage and a current applied to the transmission antenna 201 and calculates the transmission power $P_{TX}$ based on the product of the detected voltage and current. The transmission power $P_{TX}$ may be used to detect a foreign object.

The power control part 216 extracts a CE packet instructing an increase or a decrease of the transmission power from the control signal S3. The power control part 216 changes one of the switching frequency f, the phase difference α, and the duty ratio d, or transitions to a different mode, in response to the CE packet in each mode.

Figure 10:
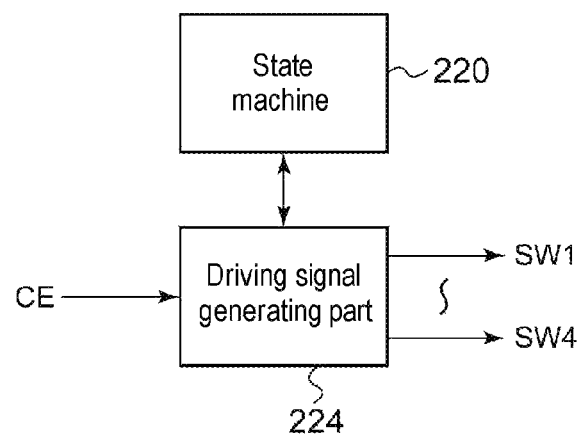
FIG. 10 is a block diagram illustrating a configuration example of a power control part.

FIG. 10 is a block diagram illustrating a configuration example of the power control part 216. The power control part 216 may be configured as a logic circuit. The power control part 216 includes a state machine 220 and a driving signal generating part 224. The state machine 220 selects an appropriate mode based on the switching frequency f, the duty ratio d, the phase difference α, and the CE packet. The driving signal generating part 224 generates a driving signal for controlling the four switches SW1 to SW4 of the inverter circuit 204 depending on the CE packet and the current mode. In the first mode φ1, the driving signal generating part 224 changes the phase difference α in response to the CE packet. In the second mode φ2, the third mode φ3, and the fourth mode φ4, the driving signal generating part 224 changes the switching frequency f in response to the CE packet. In the fifth mode φ5, the driving signal generating part 224 changes the duty ratio d in response to the CE packet.

Figure 11:
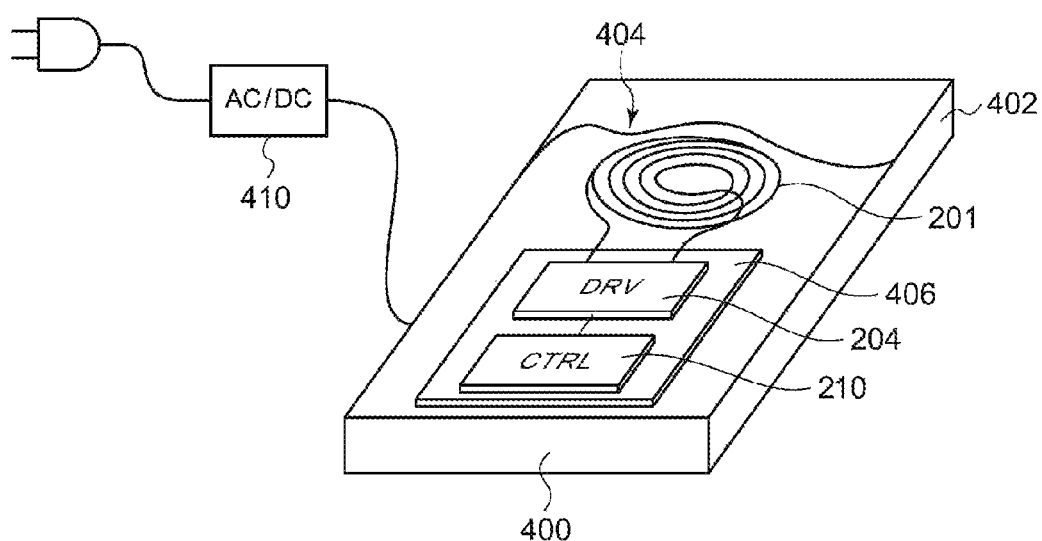
FIG. 11 is a circuit diagram of a charger including a power transmitter.

Next, the applications of the power transmitter 200 will be described. FIG. 11 is a circuit diagram of a charger 400 including the power transmitter 200. The charger 400 charges an electronic device 500 including the power receiver 300. The charger 400 includes a housing 402, a charge stand 404, and a circuit board 406. The electronic device to be supplied with power is disposed on the charge stand 404. The inverter circuit 204, the control circuit 210, and other circuit components are mounted on the circuit board 406. The transmission antenna 201 is laid out directly below the charge stand 404. The charger 400 may receive a DC voltage by an AC/DC converter 410 or may include an AC/DC converter therein. Alternatively, the charger 400 may be supplied with a DC power from outside via a bus including a power feed line such as a universal serial bus (USB).

It is to be understood by those skilled in the art that the embodiments are merely illustrative and may be variously modified by any combination of the components or processes, and the modifications are also within the scope of the present disclosure. Hereinafter, these modifications will be described.

(First Modification)

In the embodiment, it has been illustrated that, when the transmission power $P_{TX}$ is further increased, the second mode φ2 transitions to the first mode φ1 without passing through the third mode φ3, but the second mode φ2 may transition to the first mode φ1 by passing through the third mode φ3. Specifically, when a positive CE packet is received in a state where the switching frequency f is decreased to the second frequency $f_2$ in the second mode φ2, the second mode φ2 may transition to the third mode φ3.

(Second Modification)

In the embodiment, it has been illustrated that, when the transmission power $P_{TX}$ is further increased, the third mode φ3 transitions to the second mode φ2, but an upper limit of a frequency of the third mode φ3 may be set to a second frequency $f_2$ (205 kHz) and the third mode φ3 may transition to the fifth mode φ5.

(Third Modification)

In the embodiment, it has been illustrated that the fourth mode φ4 and the fifth mode φ5 are selectable, but when a range of the transmission power $P_{TX}$ is narrow, any one or both of them may be omitted.

(Fourth Modification)

In the embodiment, the Qi standard has been described, but the present disclosure is also applicable to standards derived from the Qi standard to be developed in the future, or any other standards.

According to some embodiments of the present disclosure, it is possible to seamlessly switch a full-bridge operation and a half-bridge operation of an inverter circuit.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A wireless power transmitter for transmitting a power signal to a wireless power receiver, comprising:
   a transmission antenna including a transmission coil;
   an inverter circuit including a first switch installed between a power line and one end of the transmission antenna, a second switch installed between the power line and the other end of the transmission antenna, a third switch installed between the one end of the transmission antenna and a ground line, and a fourth switch installed between the other end of the transmission antenna and the ground line; and
   a control circuit configured to demodulate a control signal received by the transmission antenna from the wireless power transmitter and control the inverter circuit based on power control data included in the control signal,
   wherein the control circuit is configured to select:
   (i) a first mode in which a first pair including the first switch and the second switch are complementarily switched at a duty ratio of 50%, a second pair including the third switch and the fourth switch are complementarily switched at a duty ratio of 50%, a phase difference of the first pair and the second pair is changed between a minimum value and a maximum value depending on a transmission power, and the inverter circuit performs a full-bridge operation;
   (ii) a second mode in which the first pair are complementarily switched at a duty ratio of 50%, a switching frequency is changed depending on the transmission power, and the inverter circuit performs a half-bridge operation; and (iii) a third mode in which the first pair are complementarily switched at a duty ratio of 50%, the second pair are complementarily switched at a duty ratio of 50%, the phase difference of the first pair and the second pair is changed to the minimum value, the switching frequency is changed depending on the transmission power, and the inverter circuit performs a full-bridge operation.

2. The wireless power transmitter of claim 1, wherein, when the transmission power is decreased, the control circuit is configured to perform transition in an order of the first mode and the third mode.

3. The wireless power transmitter of claim 1, wherein, when the transmission power is increased, the control circuit is configured to perform transition from the second mode to the first mode without passing through the third mode.

4. The wireless power transmitter of claim 1, wherein the control circuit is configured to select, in addition to the first mode to the third mode:
(iv) a fourth mode in which the first pair are complementarily switched at a duty ratio of 50%, the second pair are complementarily switched at a duty ratio of 50%, the phase difference of the first pair and the second pair is changed to the maximum value, the switching frequency is changed depending on the transmission power, and the inverter circuit performs a full-bridge operation,
wherein, when the transmission power is further increased, the first mode transitions to the fourth mode.

5. The wireless power transmitter of claim 1, wherein the control circuit is configured to select, in addition to the first mode to third mode:
(v) a fifth mode in which the first pair are complementarily switched to a maximum switching frequency, a duty ratio of the first pair is changed depending on the transmission power, and the inverter circuit performs a half-bridge operation,
wherein, when the transmission power is further decreased, the second mode transitions to the fifth mode.

6. The wireless power transmitter of claim 1, wherein the wireless power transmitter is based on a Qi standard.

7. A charger comprising the wireless power transmitter of claim 1.

8. A control circuit for use in a wireless power transmitter for transmitting a power signal to a wireless power receiver,
wherein the wireless power transmitter comprises, in addition to the control circuit:
a transmission antenna including a transmission coil; and
an inverter circuit including a first switch installed between a power line and one end of the transmission antenna, a second switch installed between the power line and the other end of the transmission antenna, a third switch installed between the one end of the transmission antenna and a ground line, and a fourth switch installed between the other end of the transmission antenna and the ground line,
wherein the control circuit comprises:
a demodulator configured to demodulate a control signal received by the transmission antenna from the wireless power transmitter; and
a power control part configured to generate the control signal to the inverter circuit based on power control data included in the control signal and instructing an increase or a decrease of a transmission power,
wherein the power control part is configured to select:
(i) a first mode in which a first pair including the first switch and the second switch are complementarily switched at a duty ratio of 50%, a second pair including the third switch and the fourth switch are complementarily switched at a duty ratio of 50%, a phase difference of the first pair and the second pair is changed between a minimum value and a maximum value depending on the transmission power, and the inverter circuit performs a full-bridge operation;
(ii) a second mode in which the first pair are complementarily switched at a duty ratio of 50%, a switching frequency is changed depending on the transmission power, and the inverter circuit performs a half-bridge operation; and
(iii) a third mode in which the first pair are complementarily switched at a duty ratio of 50%, the second pair are complementarily switched at a duty ratio of 50%, the phase difference of the first pair and the second pair is changed to the minimum value, the switching frequency is changed depending on the transmission power, and the inverter circuit performs a full-bridge operation.

9. The control circuit of claim 8, wherein, when the transmission power is decreased, the power control part is configured to perform transition in an order of the first mode and the third mode.

10. The control circuit of claim 8, wherein, when the transmission power is increased, the power control part is configured to perform transition from the second mode to the first mode without passing through the third mode.

11. The control circuit of claim 8, wherein the wireless power transmitter is based on a Qi standard.

12. The control circuit of claim 8, wherein the control circuit is integrated on a single semiconductor substrate.

13. A control method of a wireless power transmitter for transmitting a power signal to a wireless power receiver,
wherein the wireless power transmitter comprises:
a transmission antenna including a transmission coil; and
an inverter circuit including a first switch installed between a power line and one end of the transmission antenna, a second switch installed between the power line and the other end of the transmission antenna, a third switch installed between the one end of the transmission antenna and a ground line, and a fourth switch installed between the other end of the transmission antenna and the ground line,
wherein the control method comprises:
(i) a first step where a first pair including the first switch and the second switch are complementarily switched at a duty ratio of 50%, a second pair including the third switch and the fourth switch are complementarily switched at a duty ratio of 50%, a phase difference of the first pair and the second pair is changed between a minimum value and a maximum value depending on a transmission power, and the inverter circuit performs a full-bridge operation;
(ii) a second step where the first pair are complementarily switched at a duty ratio of 50%, a switching frequency is changed depending on the transmission power, and the inverter circuit performs a half-bridge operation;
(iii) a third step where the first pair are complementarily switched at a duty ratio of 50%, the second pair are complementarily switched at a duty ratio of 50%, the phase difference of the first pair and the second pair is changed to the minimum value, the switching frequency is changed depending on the transmission power, and the inverter circuit performs a full-bridge operation; and a step of switching the first step to the third step depending on the transmission power.

14. The control method of claim 13, wherein, when the transmission power is decreased, transition is made in an order of the first step and the third step.

15. The control method of claim 13, wherein, when the transmission power is increased, the second step transitions to the first step without passing through the third step.

* * * * *